United States Patent [19]

Dosch et al.

[11] Patent Number: 5,461,022
[45] Date of Patent: Oct. 24, 1995

[54] THIN FILM HYDROUS METAL OXIDE CATALYSTS

[75] Inventors: Robert G. Dosch; Howard P. Stephens, both of Albuquerque, N.M.

[73] Assignee: Sandia Corporation, Albuquerque, N.M.

[21] Appl. No.: 998,997

[22] Filed: Dec. 31, 1992

[51] Int. Cl.$^6$ .................. B01J 37/025; B01J 37/20; B01J 21/06; B01J 23/02
[52] U.S. Cl. .................. 502/242; 502/243; 502/250; 502/251; 502/252; 502/246; 502/439; 502/220; 502/11
[58] Field of Search .................. 502/439, 220, 502/255, 309, 311, 315, 11, 242, 243, 250, 251, 252, 246; 427/383.1, 383.3, 383.5, 383.7, 404, 405, 419.2, 419.3, 229, 245, 247, 255

[56] References Cited

U.S. PATENT DOCUMENTS

| | | | |
|---|---|---|---|
| 4,085,193 | 4/1978 | Nakajima et al. | 502/309 X |
| 4,511,455 | 4/1985 | Dosch et al. | 208/10 |
| 4,652,467 | 3/1987 | Brinker et al. | 427/247 X |
| 4,929,582 | 5/1990 | Dosch et al. | 502/11 |
| 4,929,586 | 5/1990 | Hegedus et al. | 502/309 X |
| 5,137,855 | 8/1992 | Hegedus et al. | 502/309 X |
| 5,175,027 | 12/1992 | Holmes-Farley et al. | 427/387 |
| 5,177,045 | 1/1993 | Anthony et al. | 502/309 X |
| 5,189,952 | 3/1993 | Ohmura et al. | 427/266 X |

OTHER PUBLICATIONS

Chemical Abstracts, vol. 115, No. 26, p. 2, 1991, CA115(26):280612u.

Feng et al., "Reactions of propane on hydrous metal oxide-supported catalysts", Prepr. Pap.–Am. Chem. Soc., Div. Fuel Chem., 36(4), 1991, 1826–32.

"Development of Thin Film Hydrous Metal Oxide Supported Catalysts for Direct Coal Liquefaction", by R. G. Dosch et al., Proceedings Liquefaction Contractors' Review Meeting, Pittsburgh, Pa. (published 1992).

Primary Examiner—Paul Lieberman
Assistant Examiner—Douglas J. McGinty
Attorney, Agent, or Firm—Jeffrey D. Myers

[57] ABSTRACT

Thin film (<100 nm) hydrous metal oxide catalysts are prepared by 1) synthesis of a hydrous metal oxide, 2) deposition of the hydrous metal oxide upon an inert support surface, 3) ion exchange with catalytically active metals, and 4) activating the hydrous metal oxide catalysts.

18 Claims, No Drawings

THIN FILM HYDROUS METAL OXIDE CATALYSTS

GOVERNMENT RIGHTS

The U.S. Government has a paid-up license in this invention and the right in limited circumstances to require the patent owner to license others on reasonable terms.

CROSS-REFERENCE TO RELATED APPLICATIONS

A related application, Ser. No. 07/751,003, entitled Crystalline Titanate Catalyst Supports, Dosch, et al., has been filed Aug. 28, 1991, now U.S. Pat. No. 5,177,045, the teachings of which are incorporated herein by reference.

Another related application Ser. No. 06/849,626, to Dosch, filed Apr. 9, 1986, is now abandoned, entitled Preparation of Catalysts Via Ion-Exchangeable Coatings on Supports, the teachings of which are incorporated herein by reference.

BACKGROUND OF THE INVENTION

1. Field of the Invention (Technical Field)

The present invention relates to thin film hydrous metal oxide catalysts; and methods of making and using such catalysts.

2. Background Art

Hydrous metal oxide (HMO)-supported catalysts, such as palladium, platinum, rhodium, or nickel-molybdenum type catalysts on alkoxide derived hydrous titanium, niobium, zirconium, and tantalum oxides are generally superior to the several available commercial catalysts. One of their drawbacks, however, is higher cost due to raw material expense. Further, such HMO-supported catalysts have to be manufactured in a suitable engineering form, for example, grains, spheres, extrudate and the like, which entail even higher cost.

U.S. Pat. No. 4,511,455 to Dosch et al., entitled Catalysis Using Hydrous Metal Oxide Ion Exchanges, describes a method for preparing bulk hydrous metal oxide catalysts using ion exchange to load various active metals. While various shapes of catalyst are suggested, there is no disclosure therein relating to thin film catalyst formation upon inert supports.

However, by preparing hydrous metal oxide thin films (<100nm) on inexpensive inert supports, the favorable catalyst properties of the HMO materials are retained or even enhanced, but the expensive components of the HMO materials are only 10% or less of that comprising bulk hydrous metal oxide catalysts. Further, the physical properties of thin film HMO catalysts such as surface area and pore size distribution, can be determined by commercially available engineered materials, rather than the properties of the bulk HMO material. This, of course, eliminates the need for research to convert HMO catalysts to usable geometric forms and provides more choices with respect to physical properties. The present invention is partially described in Development of Thin Film Hydrous Metal Oxide Supported Catalysts for Direct Coal Liquefaction, Dosch et al., Proceedings Liquefaction Contractors' Review Meeting, Pittsburgh, Pa. (published 1992), the teachings of which are incorporated herein by reference.

Additionally, virtually any surface, porous or non-porous, which permits atomic dispersion of the active metals, can be used. For example, metallic structures or quartz sand as well as porous materials such as silica gel or alumina, comprise suitable thin film HMO catalyst supports.

SUMMARY OF THE INVENTION (DISCLOSURE OF THE INVENTION)

The present invention relates to methods of making thin film (preferably less than 100 nm) hydrous metal oxide catalysts, articles of manufacture including such catalysts, and methods of using such catalysts. The present invention comprises synthesizing a hydrous metal oxide; depositing a thin film of the hydrous metal oxide upon an inert support; exchanging cations and/or anions of catalytically active metals or complexes thereof with the hydrous metal oxide to form a hydrous metal oxide catalyst; and activating the thin film hydrous metal oxide catalyst. The above steps can be repeated one or more times to form additional coatings.

The preferred hydrous oxides, useful in accordance with the present invention, are titanium, niobium, zirconium, tantalum and iron. They are prepared using metal alkoxides and metal hydroxide. For hydrous titanium oxides, the alkoxides can be tetramethyl titanate, tetraethyl titanate, tetra(n-propyl) titanate, tetraisopropyl titanate, tetrabutyl titanate, tetraethylorthosilicate, tetramethylammonium titanate, tetraethylammonium titanate, tetrapropylammonium titanate, and tetrabutylammonium titanate. The metal hydroxide is an alkali or alkaline earth metal. The preferred ion exchange metals are molybdenum, nickel, palladium, platinum, rhodium, and alloys thereof. Essentially 100 percent exchange is effected during the ion exchange.

The thin film of the hydrous metal oxide can be deposited on any inert support structure (porous or non-porous), such as sand, grains, powders, pellets, beads, monoliths, spheres, gels, flat surfaces, and the like, made from a variety of materials, such as metals, carbons, ceramics, glasses, alloys thereof, and the like. The catalytically active metal or complex in the catalyst is preferably between approximately 0.1 and 20 percent by weight, based on the total weight of the catalyst.

Activation of the thin film hydrous metal oxide catalyst can be performed by calcining, heating, sulfiding, reducing, or a combination thereof.

The present invention is useful for numerous catalytic processes, including: hydrogenating pyrene to dihydropyrene; hydrodesulfurizing dibenzothiophene; dehydrogenation; hydrocarbon hydrotreatment; cracking of alkanes; hydrogenation, hydrodesulfurization, and hydrodenitrogenation of coal-derived liquids and residuals; reforming of hydrocarbons; denitrogenation of nitrogen-containing hydrocarbons; and the like. Catalysts produced include oxidation catalysts for hydrocarbons, water-gas shift catalysts, methanation catalysts, catalysts for reduction of nitrogen oxides (NOx), and the like.

An object of the invention is the provision of thin film hydrous metal oxide catalysts on inert supports.

Another object of the invention is the provisions of thin film hydrous metal oxide catalysts having predetermined physical properties.

Yet another object of the invention is the provision of thin film hydrous metal oxide catalysts adapted to both porous and non-porous support surfaces.

An advantage of the invention is the retention of favorable catalyst properties while reducing the amount of expensive components.

Another advantage of the invention is its ease of adaptation of the thin film hydrous metal oxide catalysts to a variety of geometrically shaped inert supports.

Still another advantage of the invention is the large variety of inert support materials which can be used as substrates for the thin film hydrous metal oxide catalysts.

Other objects, advantages and novel features, and further scope of applicability of the present invention will be set forth in part in the detailed description to follow, and in part will become apparent to those skilled in the art upon examination of the following, or may be learned by practice of the invention. The objects and advantages of the invention may be realized and attained by means of the instrumentalities and combinations particularly pointed out in the appended claims.

DESCRIPTION OF THE PREFERRED EMBODIMENTS

BEST MODES FOR CARRYING OUT THE INVENTION

The preferred method of preparation of thin film hydrous metal oxide (HMO) or hydrous titanium oxide (HTO) catalysts, in accordance with the present invention comprises four steps: 1) synthesis of a water or alcohol soluble hydrous oxide precursor, preferably titanium, zirconium, tantalum, niobium, iron, and which may contain a modifier such as silicon; 2) deposition of a hydrous oxide coating by contacting a support with the HMO solution (aqueous or alcohol solution) to form a thin film of the HMO solution on the surface or within the pore structure of the support; 3) ion exchange of catalytically active metals from solution into the HMO film; and 4) catalytic activation of the HMO catalysts, for example, heating, sulfiding, calcining, reducing, combinations thereof, and the like.

The active metals are dispersed on the hydrous oxide catalysts by ion exchange similar to ion exchange with bulk HMO or HTO catalysts. Obviously, the techniques applicable to bulk HMO or HTO catalysts are also applicable to the thin film catalysts.

Because active metals are dispersed on HMO catalysts by ion exchange, they are chemically associated with the HMO support. Therefore activation techniques must result in release of the active metal components from the HMO support. For example, activation of Mo-based HMO catalysts is performed in two steps: (1) calcination in air at approximately 500° C. to release the Mo and promoter ions from the HMO structure, followed by (2) sulfidation at approximately 425° C. with a 10% mixture of $H_2S$ in $H_2$.

The first step involving the reaction of the alkoxide with a base is generally carried out in an alcohol solution. Typical alcohols include the lower alcohols such as methanol, ethanol, isopropanol, and the like. It is necessary that the hydroxide which is used in preparing the initial material be soluble in the alcohol solvent. Accordingly, the alkali or alkaline earth metal hydroxides are employed. If desired, alkaline earths with relatively alcohol insoluble hydroxides can subsequently be substituted by ion exchange. These reactions go to completion essentially instantaneously e.g., on the order of minutes and, thus, can conveniently be carried out at room temperature. However, of course, temperatures up to the boiling point of the reaction medium can be used. In general, the mole ratio of hydroxide to titanium can vary up to a value of about 2. All starting materials are commercially available. The structure of the soluble intermediate has not yet been elucidated. The hydrous oxides, as prepared, are X-ray amorphous.

HMO catalysts are preferably prepared by a technique that consists of synthesis of sodium hydrous (e.g. titanate) ion exchange material followed by ion exchange of the sodium for active metal ions. The preferred synthesis involves three steps, using tetraisopropyl titanate, as an example:

(1) Reaction of tetraisopropyl titanate with sodium hydroxide in alcohol solution to form a soluble intermediate:

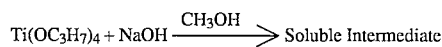

(2) Hydrolysis of the soluble intermediate in acetone/water mixtures to form the hydrous metal oxide ion exchange material:

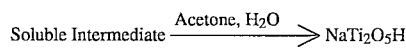

where $NaTi_2O_5H$ is an empirical representation of the actual material.

(3) Ion exchange of the sodium for active metal ions in aqueous solution to form the catalyst:

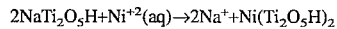

In addition to the capacity to exchange metal ions, contact of the ion-exchangers with acidic solutions results in exchange of hydrogen ions, which alters the acidity and catalytic activity of the material. The materials can also function as anion exchangers in acidic solutions, allowing adsorption of metals that exist as aqueous oxygenated anions; molybdates, for example.

Catalyst preparation by coating inert supports with a thin film of a hydrous metal oxide ion-exchanger offers the potential of tailoring catalyst activity and selectivity by appropriate choice of active metal combinations and substrate physical properties such as strength, surface area, and pore size. Additionally, an excellent dispersion of active metals may be achieved by this technique.

The third step involves the loading of the hydrous ion exchange material with the desired active metal. For this purpose, the hydrous product of the previous step is usually dried at ambient temperature in vacuo. The degree of vacuum is not critical but will be chosen to afford a satisfactory drying time. Drying at higher temperatures is disadvantageous since both the surface area and the ion exchange capacity decrease essentially linearly as the drying temperature increases in the range of room temperature to about 500° C. The metal loading step is carried out very easily by simply treating the dried hydrous support material with an aqueous solution of an active metal salt or mixture thereof. Active metal complexes can also be used as long as the tenacity of binding of the metal cation to the ligands is less than its affinity for the ion exchange material.

The amount of active metal loaded onto the support material can be very easily controlled. Final values will be selected routinely in accordance with the details of the reaction of interest. For example, the degree of loading can be limited by limiting the amount of alkali metal or alkaline earth metal in the support material by appropriately limiting the amount of alkali metal or alkaline earth metal hydroxide used in the first step of the preparation. Alternatively, by appropriately controlling the amount of active metal cations in the aqueous solution used to treat the support in the loading step a selected proportion of alkali metal or alkaline earth metal cations in the support can be exchanged. Generally, 100% exchange can be effected. The amount of active metal in a catalyst will be in the range of 0.1–20 wt % (depending on the atomic weight of the cation), based upon the total weight of the catalyst.

The active metals to be exchanged with the support material are not limited. Basically, any cation or anion can be exchanged onto the hydrous metal oxide support material. Selection of the active metal or mixture of active metals will be made routinely by those skilled in the art, with a few routine preliminary experiments, in conjunction with conventional considerations pertaining to the reaction of interest. Typical active metals are palladium, platinum, rhodium, nickel and molybdenum.

In general, the pore volumes of the catalysts used in this invention will be in the range of about 0.2–1.0 cc/g. However, higher or lower values can be achieved if desired. Typical specific surface areas will be in the range of about 150 to greater than 300 $m^2/g$. Again, lower or higher values can be achieved if desired. Typical exchange capacities can be varied over a large range in dependence upon the amount of alkali metal or alkali earth metal which is reacted in the first step of the preparation described above. Generally, exchange capacities will be in the range of a few milliequivalents per gram of HMO. Again, actual values can vary significantly depending upon the end use. For all of these and, as well, other properties of the catalysts optimum values in a given reaction can be readily determined with a few routine preliminary experiments.

Generally, the catalyst is used as obtained from the active metal loading step after a room temperature vacuum drying as described above. In some cases, calcination and other activation treatments at temperatures up to 500° C. have been shown not to affect the catalytic properties significantly.

The catalysts of this invention can be used in essentially all prior art reactions which can employ catalytic metals on hydrous metal oxide carriers. Such processes are extremely diverse and include, e.g., reforming reactions, oxidation reactions, dehydrations, Fischer Tropsch reactions, reductions, and the like. Particularly preferred reactions of this invention are the hydrocarbon hydrotreatment processes, e.g., tar, heavy oil, cracking, coal liquefaction, and the like. The products of such reactions are well known to those skilled in the art as are the appropriate reaction conditions. All of these details are fully applicable to this invention; that is, in general, the hydrotreating or other process of this invention will be fully conventional in all aspects except for the use of the catalyst required by this invention.

Using the catalyst preparation process of this invention, by appropriately controlling the amount of active metal in the aqueous loading solution, the amount of active metal in the HMO film can be varied from a thin surface film to a thorough impregnation via ion exchange, i.e., complete conversion of the alkali and alkaline earth metal cations. Generally, complete conversion will be used in the preparation of the catalysts.

Summarizing, the film-forming solutions of the present invention comprise a metal hydroxide typically soluble in methyl alcohol. The metal hydroxide comprises an alkali or alkaline earth metal such as, for example, lithium, sodium, potassium, rubidium, cesium or barium; the general formula for which is typically $M(OH)_x$, wherein x=1 or 2, and M=Li, Na, K, Rb, Cs or Ba.

A metal alkoxide reacts with the metal hydroxide to form a soluble product. The metal alkoxide, of the general formula $M(OR)_x$, where x is in the range of 1 to 5, and M=titanium, niobium, zirconium, tantalum or iron, further comprises an alkoxide group. The alkoxide group is of the general formula $R=C_xH_y$, wherein x is in the range of 1 to 6, and y=2x+1.

As a film modifier, $Si(OC_2H_5)_4$ is preferably used, but other film modifiers may be applicable. The general solution composition expressed in mole ratios is as follows:

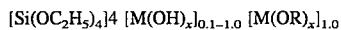
$[Si(OC_2H_5)_4]4$ $[M(OH)_x]_{0.1-1.0}$ $[M(OR)_x]_{1.0}$

The most concentrated solution preferably comprises a mixture of:
1) 10% by weight solution of $M(OH)_x$ in an alcohol, ROH, wherein R is $CH_3$ but may be $C_2H_5$, $C_3H_7$ or $C_4H_9$, and the like;
2) Pure $M(OR)_x$; and
3) Pure $Si(OC_2H_5)_4$.

The solution may be diluted to any extent with an alcohol. Such dilution controls the thickness and adherence of the thin film.

The thin film characteristics are similar to solution characteristics in that the mole ratios of metals and silicon in the film are the same as those in the film forming solution.

Virtually any "active" metal cation can be put into the film by ion exchange with the metal in the base, $M(OH)_x$, solution. Active metal content in the film would typically be in the range of 0.1– 5.0 milliequivalents (meq.) per gram of film. "Active" metal anions such as molybdates, chromates, or tungstates can be incorporated in the films by ion-pair adsorption at approximate pH<4. Non-metal anions, for example $Cl^-$, $SO_4^-$, or $PO_4^=$ can also be incorporated in the films by ion-pair adsorption at pH<4. Such ion pairs can control the acidity of the film.

The various processes of preparing the catalysts have been performed at temperature ranges from approximate 20° C. to 500° C. Thermal stability of the thin film inert support is the primary factor limiting upper temperature limit.

Extrapolating, it further appears that the formation of many small Ni-Mo HMO "islands" within the pore structure of a porous support is more desirable than a few larger islands. Non-porous surfaces are completely coated, i.e. islands do not form. Additionally, the possibility is suggested that thin film HMO catalysts can be a mixture of two or more different catalysts, resulting in multifunctionality.

Industrial Applicability

The invention is further illustrated by the following non-limiting examples.

EXAMPLE 1

CATALYST TESTING

Initial tests were conducted on powdered (−100 mesh) and particulate catalysts (granular, extrudate, or spherical) using batch microautoclaves for rapid screening of a large number of preparations to determine their activity for model reactions such as pyrene hydrogenation and dibenzothiophene desulfurization. The batch microautoclaves had liquid reactant capacities of 2 cc and a gas-phase volume of 25 cc. Four reactors were operated simultaneously. A typical experiment was carried out as follows. After being charged with the catalyst and reactant, the reactors were heated to temperature in a fluidized sand bath while being shaken with a wrist-action motion at 200 cycles/min. Temperatures and pressures were recorded with a digital data acquisition system during the course of the experiments. Following the heating period, the reactors were rapidly quenched to ambient temperature, a gas sample was taken and the products were removed for analysis by various techniques, including gas and liquid chromatography and elemental composition. For sulfided NiMo catalysts, pyrene hydrogenation tests were typically carried out at 300° C. and 500 psig cold charge hydrogen pressure, and dibenzothiophene desulfurization at 350° C. and 1200 psig. For the more active noble metal catalysts such as Pd/HTO, pyrene hydrogenation experiments were typically performed at 100° C. and 100 psig.

Bulk-Phase NiMo/HTO Catalysts

The development of NiMo/HTO catalysts progressed to the point where the hydrogenation activity of HTO-supported materials, as measured by the hydrogenation of pyrene, was significantly higher than that of commercially available NiMo/$Al_2O_3$ catalysts used for coal liquefaction. NiMo/HTO catalysts exhibiting pseudo-first-order rate constants for pyrene hydrogenation of 0.19 $sec^{-1}$ g $cat^{-1}$ (1.66 $sec^{-1}$ g $Mo^{-1}$) for the powdered catalyst (−100 mesh) were routinely prepared. This hydrogenation activity can be compared to that of 0.16 $sec^{-1}$ g $cat^{-1}$ (1.21 $sec^{-1}$ g $Mo^{-1}$) for powdered Shell 324M in tests run under identical conditions.

Further advances in catalytic activity were made via a combination of HTO substrate modification and changes in metal loading techniques. The addition of tetraethylorthosilicate in the first step of the synthesis to achieve a Ti/Si ration of 0.2 for the ion-exchanger was found to further increase activity. The $Na_{0.5}$Ti/0.2Si supports were converted to the $H_{0.5}$Ti/0.2Si form prior to metal loading. Mo was introduced onto the support via an ion exchange reaction. Following drying at 100° C., Ni was introduced by wetting with a minimum amount of aqueous $Ni(NO_3)_2$ solution. With this method, most, but probably not all of the Ni was fixed on the support via ion exchange. After the Ni loading step, the materials were dried at 100° C., pelletized, calcined at 500° C., and sulfided at 425° C. prior to testing. The powdered form of this catalyst (8.69% Mo, 2.95% Ni) was found to have a pseudo-first-order rate constant for pyrene hydrogenation of 0.22 $sec^{-1}$ g $cat^{-1}$ (2.32 $sec^{-1}$ g $Mo^{-1}$). The desulfurization activity as measured by the pseudo-first-order rate constant for dibenzothiophene desulfurization (0.027 $sec^{-1}$ g $cat^{-1}$) was also found to be significantly greater than that for Shell 324M (0.021). It appears that the increase in activity due to silicon addition was achieved, in part, by the stabilizing effect that Si has on the surface area of the calcined and sulfided catalysts. Catalysts containing silicon had approximately 60% higher surface area than preparations without silicon (150 vs 90 $m^2$/g).

Transmission electron microscopy (TEM) of the sulfided NiMo/HTO and commercial NiMo/alumina catalysts showed that the greater activity of the HTO catalysts appears to result from a better dispersion of the Mo sulfide crystallites. Whereas the alumina catalysts appeared to contain 50 to 70 angstrom-size stacks of 4–6 $MoS_2$ layers supported on amorphous alumina, the HTO catalysts contained 50 to 70 angstrom-size crystallites of only 1–2 $MoS_2$ layers supported on 100 to 150 angstrom diameter anatase crystallites formed during the calcination process.

HTO-Coated Catalyst Supports

The information obtained from the development of bulk-phase HTO catalysts was found to be directly applicable to the preparation of thin-film NiMO/HTO catalysts on preformed supports. Application of HTO catalysts as thin films on support material is a promising approach to preparing inexpensive catalysts, because smaller amounts of HTO ion-exchanger material and active metals are required, and inexpensive supports may be used. Initially, thin-film NiMo/HTO catalysts supported on a material referred to as controlled pore glass (CPG), available in −20 mesh granular form, were prepared. Results of experiments performed to compare the hydrogenation activities of bulk-phase and thin-film Pd/HTO-coated and NiMo/HTO-coated CPG catalysts showed that the thin-film catalysts had comparable or greater activities on a weight of active metal basis.

NiMo/HTO-coated catalysts were prepared using a porous silica support in spherical form, 1.5 mm in diameter. The silica spherical support had a surface area of 55 $m^2$/g, an average pore diameter of 77 nm, and a total pore volume of 1.00 cc/g. The spheres were first coated with a thin film of HTO followed by exchange of Mo and Ni onto the thin film to achieve nominal Mo loadings of 1% and Ni loadings of 0.3%. Following calcination and sulfidation, the catalysts were tested for their activity for hydrogenation of pyrene to 4,5-dihydropyrene at 300° C., and desulfurization of dibenzothiophene at 350° C. These spherical silica NiMo/HTO-coated catalysts had weight basis rate constants for pyrene hydrogenation of 0.032±0,003 $sec^{-1}$-g $cat^{-1}$ as compared to 0,041 for Shell 324M extrudate (0.78 mm diameter by 4 mm long) and 0.038 for Amocat 1C extrudate (1.59 mm diameter by 6 mm long). On a weight of active metal (Mo) basis, the rate constants ranged from 2.6 to 3.5 $sec^{-1}$ g $Mo^{-1}$, a factor of ten greater than that of 0.31 for Shell 324M. For dibenzothiophene desulfurization, rate constants of 0.0081±0.0003 $sec^{-1}$ g $cat^{-1}$ were determined for the NiMo/HTO-coated silica spheres, compared to 0.0057 for Shell 324M. Thus, the HTO-coated silica sphere catalysts exhibited a 40% higher dibenzothiophene desulfurization activity and contained only one-tenth as much active metal as Shell 324M.

The high activity for these spherical silica HTO-coated catalysts is due, in part, to their high effectiveness factor (ratio of the rate constant for the catalyst spheres to that of the powdered catalyst), which was determined to be 0.75 (for hydrogenation), compared with the much smaller values of 0.27 and 0.22 for Shell 324M and Amocat 1C, respectively. This result is undoubtedly due, in part, to differences in the effective diffusivity resulting from the more open pore structures of the silica spheres. A factor contributing to the higher Mo weight basis activity of the NiMo/HTO-silica sphere catalysts is the better dispersion of $MoS_2$ achieved by the HTO coating process. TEM analysis showed that, as with the case for the bulk-phase HTO catalysts, the $MoS_2$ crystallites for the coated catalysts consisted of 50–70 angstrom-size crystallites of 1–2 layers of $MoS_2$ attached to small anatase crystallites. These results demonstrate that the HTO coating method can be used to produce a high activity catalyst with a low active metal loading and a geometry amenable to existing reactor systems.

EXAMPLE 2

30.0 grams of tetraisopropyl titanate (TIPT) were added to 22.0 grams 9.59% NaOH in methanol (MEOH). The clear reaction product produced having a molar composition of $Na_{0.5}$ Ti was used to coat controlled pore glass, for example, CPG 00240, 20/80 mesh with a nominal surface area of 78 $m^2$/g, a mean pore diameter of 23.7 nm, and a total pore volume of 0.95 cc/g. Ten gram quantities of CPG 00240 glass were evacuated in a vacuum chamber and covered with the HTO solution. The coated glass was filtered and dried overnight.

Na ion removal was effected with two HCl solutions at pH 4 and pH 3.6, respectively. Mo loading was accomplished by ion exchange by using ammonium paramolybdate solution at pH 3.4. pH control was effected by the use of HCl. Ni was added, for example, by contacting a desired amount of nickel nitrate solution per mean pore volume. The catalyst was calcined at 500° C. and sulfided at 425° C. in 10% $H_2S$. Pyrene hydrogenation results are given in Table 1.

EXAMPLE 3

30.0 grams of TIPT and 4.4 grams of tetraethylorthosilicate (TEOS) and 22.0 grams of 9.59% NaOH in MEOH were mixed. The clear reaction product having a molar composition of $Na_{0.5}Si_{0.2}Ti$ was used to coat 10 gram quantities of evacuated CPG 00240 glass, as in Example 1, filtered and dried. Again, the Na ion was removed with HCl, as above, and Mo and Ni were added, also as in Example 1. Calcining and sulfiding were also performed as in Example 1. Pyrene hydrogenation results are given in Table 1.

EXAMPLE 4

20.0 grams of tetramethylammonium titanate (TMA) was dissolved in 30.0 grams of $H_2O$. The resulting clear solution having a molar composition of $TMA_{0.5}Ti$, as in the preceding examples, was used to coat 10 gram quantities of evacuated CPG 00240 glass, filtered, and dried. Mo and Ni were added and the steps of calcining and sulfiding were performed, also as in the preceding examples. 15 Pyrene hydrogenation results are also given in Table 1.

TABLE 1

Composition and Pyrene Hydrogenation Activities of NiMoHTO Thin Film Catalysts on CPG Glass

| Initial Composition | Catalyst Composition Mo, % Ni, % | $k^1$, $sec^{-1} \cdot g\ Mo^{-1}$ |
|---|---|---|
| $Na_{0.5}Ti$ | 3.74 0.76 | —[2] |
| $Na_{0.5}Si_{0.2}Ti$ | 3.58 0.73 | 2.96 |
| $TMA_{0.5}Ti$ | 2.88 0.59 | 1.89 |

[1]Rate constant for hydrogenation of Py to $H_2Py$.
[2]Small amounts of $Na_{0.5}Ti$ powder were observed on the external surface of the CPG support. Since it could bias activity tests, this material was not tested.

Comparison with a commercial catalyst having a rate constant of 1.2 g $Mo^{-1} \cdot sec^{-1}$ indicates an activity of only 40% of the $Na_{0.5}Si_{0.2}Ti$ thin film catalyst.

EXAMPLE 5

A composition comprising 30.0 grams TIPT, 4.4 grams TEOS, 26.2 grams of 8.04% NaOH in MEOH was diluted with 173 grams of MEOH. The mixture was introduced into evacuated S980G silica gel spheres which had been shaken overnight with a 1N HCl solution and then dried or calcined at 500° C. The spheres were 1.5 mm in diameter, have a surface area of 55 $m^2/g$, a pore volume of 1.05 cc/g, and an average pore diameter of 77 nm.

The spheres were filtered, washed with acetone and dried under vacuum after soaking in the loading solution overnight. Na was removed with HCl at a final pH of 2.5–2.7; total acid contact time was about 2 hours. The spheres were again washed with acetone and air dried, then vacuum dried for about 2 hours. Mo was then added via ion exchange from Mo solutions, for example, ammonium paramolybdate, with initial pH's of about 4. The Mo solutions were added to spheres coated with the $H^+$-HTO film, then shaken overnight at atmospheric pressure. Solution pH increased to 4.1–4.2, then to 5–5.2 overnight. The spheres were washed with water and dried for 2 hours at 100° C.

EXAMPLE 6

Preparation of this catalyst solution was in all respects identical to that prepared in Example 4 with the sole exception of further dilution of the Example 4 solution 4:1 in MEOH.

A certain number of the coated spheres from both the Example 4 and Example 5 preparations were then calcined at 500° C.; the remaining spheres were dried at 100° C. without calcining. All portions were then loaded with Ni, for example, by the incipient wetness technique, described above. This process resulted in four catalysts identified as follow: 1) 500° C. calcined spheres coated with Example 5 solution; 2) 100° C. dried spheres coated with Example 5 solution; 3) 500° C. calcined spheres coated with Example 4 solution; and 4) 100° C. spheres coated with Example 4 solution. The four catalysts were then calcined, sulfided and tested for pyrene (Py) hydrogenation (HYD) and hydrodesulfurization of dibenzothiophene (HDS). A portion of each catalyst was ground to a −100 mesh powder and tested along with the spheres to ascertain the effects of diffusion. Table 2 reflects the relative activities of the four catalysts.

TABLE 2

Composition, Surface Area, and HYD/HDS Activities of Second Prep NiMoHTO Thin-Film Catalysts on Silica Gel Spheres

| | | Catalyst Activity[3] | | | |
|---|---|---|---|---|---|
| | | $k_{HYD}$ | | $k_{HDS}$ | |
| Catalyst[1] | Surface Props.[2] | −100 mesh | spheres | −100 mesh | spheres |
| #1 | C 58/0.94/64.4 | — | — | — | — |
| | C & S 57/0.85/60.0 | 4.84 | 3.33 | 0.97 | 0.85 |
| #2 | C 56/0.92/65.4 | — | — | — | — |
| | C & S 54/0.85/62.9 | 4.82 | 3.52 | 1.25 | 0.98 |
| #3 | C 60/0.86/57.3 | — | — | — | — |
| | C & S 59/0.87/59.1 | 4.89 | — | 0.96 | — |
| #4 | C 63/0.93/56.0 | — | — | — | — |
| | C & S 54/0.82/60.6 | 4.25 | 2.61 | 0.99 | 0.61 |
| Shell 324M[4] | S 88/0.28/12.8 | 1.21 | 0.31 | 0.21 | 0.12 |

[1]See specification for catalyst compositions.
[2]Surface area, $m^2/g$; TPV, cc/g; APD, nm. TPV = Total Pore Volume, APD = Average Pore Diameter. C = After calcining only at 500° C. C & S = After calcining at 500° C. and sulfiding at 425° C.
[3]$k_{HYD}$ = Rate constant for hydrogenation of Py to $H_2Py$ in units of g $Mo^{-1} \cdot sec^{-1}$.
$k_{HDS}$ = Rate constant for hydrodesulfurization of DBT in units of g $Mo^{-1} \cdot sec^{-1}$.
[4]Monoliths in the form of 1/16" diameter extrudate rather than spheres. Surface area measured after sulfiding.

Catalysts 1, 2, 3, and 4 each contained 0.9%, 0.9%, 1.4% and 1.3% Mo, by weight, respectively. The best commercial catalyst, Shell 324M* contained 13.2% Mo by weight. On a comparison basis of active metal weight, the pyrene hydrogenation activities of the thin film HTO catalysts were up to 10 times greater than that of Shell 324M*, and comparable on a weight-of-catalyst basis. The HDS DBT activities of the thin film catalysts were higher than Shell 324M* on an active-method-weight basis, but slightly less active on a total catalyst weight basis.

Catalysts were also prepared which contained 1, 2, and 3 separate coatings of Ni-Mo hydrous titanium oxide. The purpose of these preparations was to prepare a catalyst with up to 3 loading steps containing about 3% Ti by weight so that activity could be compared with catalysts of comparable compositions prepared with a single hydrous titanium oxide loading step.

EXAMPLE 7

Acid washed S980G spheres calcined at 500° C were used as the thin film support. 20 grams of TIPT were mixed with 2.93 grams of TEOS and 15.33 grams of 9.57% NaOH in MEOH. An additional 327.5 grams of MEOH were added. The solution covered 20 grams of evacuated spheres overnight; the beads were separated by filtration, washed with acetone and vacuum dried. $Na^+$ was removed by equilibration in HCl at pH 2.4 to 2.5; the beads were then washed with water, acetone and vacuum dried. Mo loading was accomplished by ion exchange from pH 3.5 ammonium paramolybdate solution containing excess Mo relative to the exchange capacity of the H-HTO film. The ammonium paramolybdate soaked the evacuated HHTO coated spheres overnight. The Mo-HTO coated spheres were then water washed and vacuum dried. About 25% of the spheres were nickel-loaded as described in Example 1. After calcining at 500° C. and sulfiding at 425° C., the thin film catalyst was designated Catalyst #1 in Table 3.

EXAMPLE 8

The remaining 75% of the Mo-HTO coated spheres were calcined at 345° C. for one hour. These spheres were then again subjected to the same loading process described above in Example 6. Approximately one-third of the spheres so treated were nickel-loaded, calcined and sulfided, also as described in Example 6, and were denominated Catalyst #2 in Table 3.

EXAMPLE 9

The remaining two-thirds of the spheres prepared in Example 7 were again calcined at 345° C. for one hour and yet again subjected to the same Mo-HTO loading process described in Examples 6 and 7. These spheres were again Ni-loaded, calcined and sulfided. These triply-coated spheres are denoted Catalyst #3 in Table 3. The powder comprised coated spheres ground and sieved.

TABLE 3

Composition and Pyrene Hydrogenation Activities of NiMoHTO Catalysts Made Using Multiple Coating Steps in the Preparation

| Catalyst | Coating Steps | Ti, % | Mo, % | $k^1$, g $Mo^{-1} \cdot sec^{-1}$ Whole spheres | Powder, −100 mesh |
|---|---|---|---|---|---|
| #1 | 1 | 0.95 | 0.68 | 2.51 | 3.69 |
| #2 | 2 | 1.96 | 1.01 | 2.48 | 3.63 |
| #3 | 3 | 3.05 | 1.32 | 2.58 | 4.16 |
| Single Coat Catalysts[2] | | | | | |
|  | 1 | 6.5 | 1.4 | 1.09 | 1.75 |
|  | 1 | 2.7 | 1.9 | 1.76 | 3.15 |
|  | 1 | 3.5 | 2.4 | 1.43 | 2.45 |

[1]Rate constant for hydrogenation of Py to $H_2Py$.
[2]Data included for comparison.

Table 3 provides the following conclusions: 1) each coating step resulted in approximately the same amount of hydrous titanium oxide deposition indicating that the loading process is reproducible; 2) subsequent loading steps do not have a deleterious effect on prior loading steps, suggesting the formation of new NiMo HTO islands rather than the coating of existing Ni-Mo HTO islands; 3) the pyrene hydrogenation activities on Mo-weight-basis are relatively constant over the three loading steps, and 4) the activities on a weight-of-Mo basis are significantly higher than those of catalysts containing about the same level of hydrous titanium oxide or Mo prepared with a single loading step.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents.

What is claimed is:

1. A method of making thin film hydrous metal oxide catalysts comprising the steps of:
    a) reacting a metal hydroxide comprising a metal selected from the group consisting of alkali and alkaline earth metals, a metal alkoxide comprising a metal selected from the group consisting of titanium, niobium, zirconium, tantalum and iron, and a silicon film modifier, thereby synthesizing a hydrous metal oxide;
    b) depositing a thin film of the hydrous metal oxide upon an inert support;
    c) exchanging cations and anions of at least one member selected from the group consisting of catalytically active metals and complexes thereof with the hydrous metal oxide to form a hydrous metal oxide catalyst; and
    d) activating the thin film metal oxide catalyst.

2. The method of claim 1 further comprising the steps of repeating steps a) through d).

3. A hydrous metal oxide catalyst coated on an inert support made by the process of:
    a) reacting a metal hydroxide comprising a metal selected from the group consisting of alkali and alkaline earth metals, a metal alkoxide comprising a metal selected from the group consisting of titanium, niobium, zirconium, tantalum and iron, and a silicon film modifier, thereby synthesizing a hydrous metal oxide;
    b) depositing a thin film of the hydrous metal oxide upon an inert support;
    c) exchanging cations and anions of at least one member selected from the group consisting of catalytically active metals and complexes thereof with the hydrous metal oxide to form a hydrous metal oxide catalyst; and
    d) activating the thin film metal oxide catalyst.

4. The method of claim 1 wherein the step of reacting and thereby synthesizing the hydrous metal oxide further comprises the step of synthesizing at least one hydrous metal oxide from an alkoxide selected from the group consisting of tetramethyl titanate, tetraethyl titanate, tetra(n-propyl) titanate, tetraisopropyl titanate, tetrabutyl titanate, tetramethylammonium titanate, tetraethylammonium titanate, tetrapropylammonium titanate, and tetrabutylammonium titanate.

5. The method of claim 1 wherein step of reacting and thereby synthesizing a hydrous metal oxide further comprises the step of reacting and thereby synthesizing a hydrous metal oxide using tetraethylorthosilicate.

6. The method of claim 1 wherein the step of depositing the thin film of the hydrous metal oxide comprises the step of depositing the thin film of the hydrous metal oxide upon an inert support structure selected from the group consisting of sand, grains, powders, pellets, beads, monoliths, spheres, gels, and flat surfaces.

7. The method of claim 1 wherein the step of depositing the thin film of the hydrous metal oxide upon an inert support comprises depositing on an inert support material selected from the group consisting of metals, carbons, ceramics, glasses, and alloys thereof.

8. The method of claim 1 wherein the step of exchanging cations comprises the step of removing a cation and substituting at least one member selected from the group consisting of molybdenum, nickel, palladium, platinum, rhodium, and alloys thereof.

9. The method of claim 1 wherein the step of activating the thin film hydrous metal oxide catalyst further comprises at least one process step selected from the group consisting of calcining, heating, sulfiding, and reducing the hydrous metal oxide.

10. The method of claim 1 wherein the catalytically active member in the catalyst is between approximately 0.1 and 20 percent by weight, based on the total weight of the catalyst.

11. The method of claim 1 wherein in step c), essentially 100 percent exchange is effected.

12. The catalyst of claim 3 wherein the silicon modified hydrous metal oxide further comprises tetraethylorthosilicate.

13. The catalyst of claim 3 further comprising at least one additional coating of hydrous metal oxide catalyst upon said inert support.

14. The catalyst of claim 3 wherein said inert support is a porous material.

15. The catalyst of claim 3 wherein said inert support is a non-porous material.

16. The catalyst of claim 3 wherein said inert support comprises a material selected from the group consisting of sand, monoliths, grains, powders, pellets, beads, spheres, gels, and flat surfaces.

17. The catalyst of claim 3 wherein said inert support comprises a material selected from the group consisting of metals, carbons, ceramics, glasses, and alloys thereof.

18. The catalyst of claim 3 wherein said hydrous titanium metal oxide catalyst comprises a nickel-molybdenum hydrous titanium oxide.

* * * * *